Feb. 11, 1941. G. C. DAVIS 2,231,158
MAGNETIC CONTROL MECHANISM
Filed Jan. 31, 1940 2 Sheets-Sheet 1
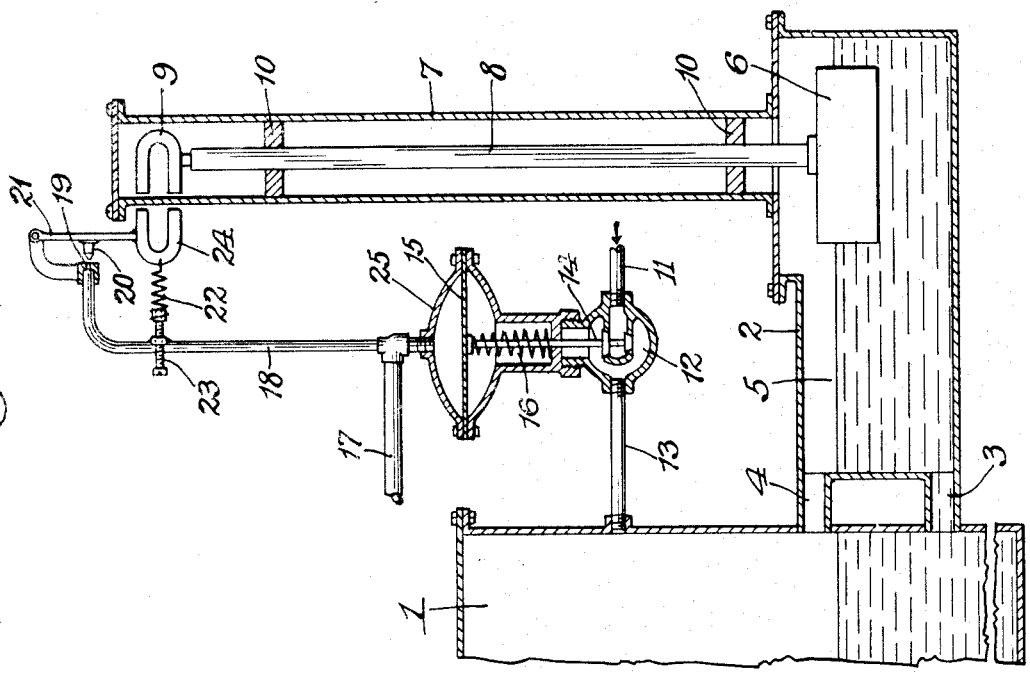
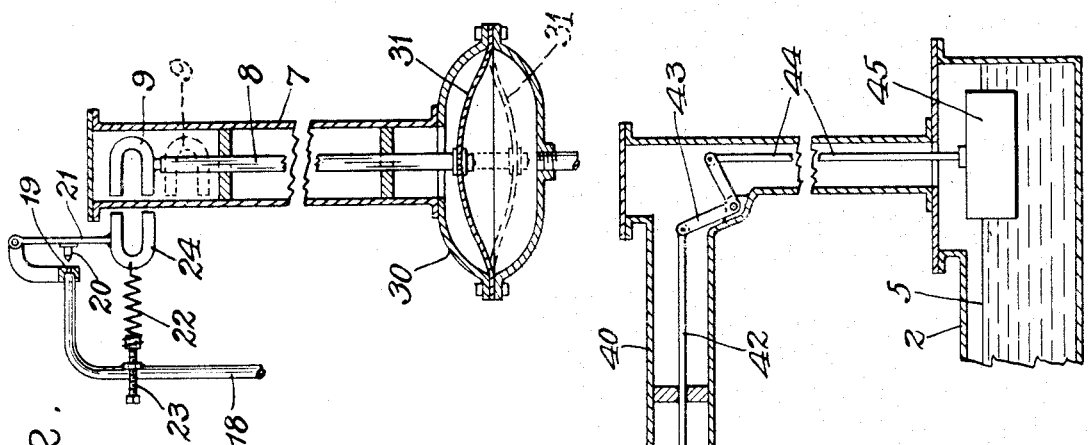
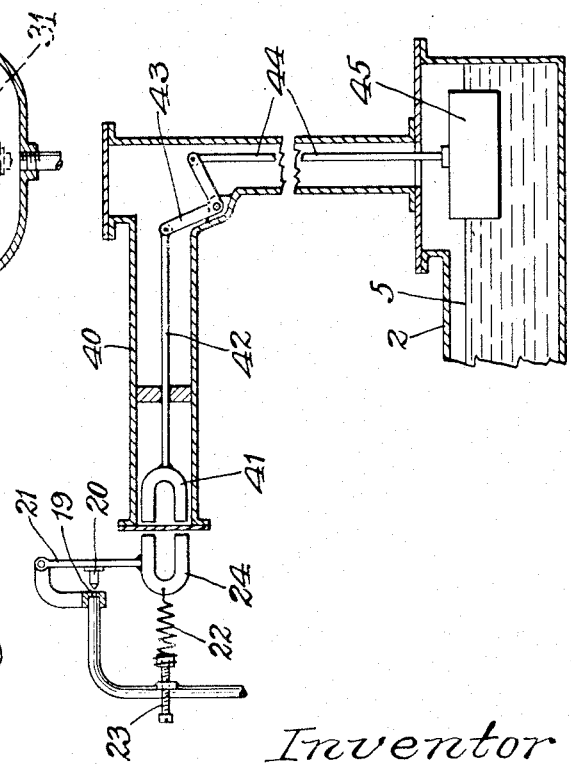
Inventor.
George C. Davis.
by Archer & Carter
Attorneys.

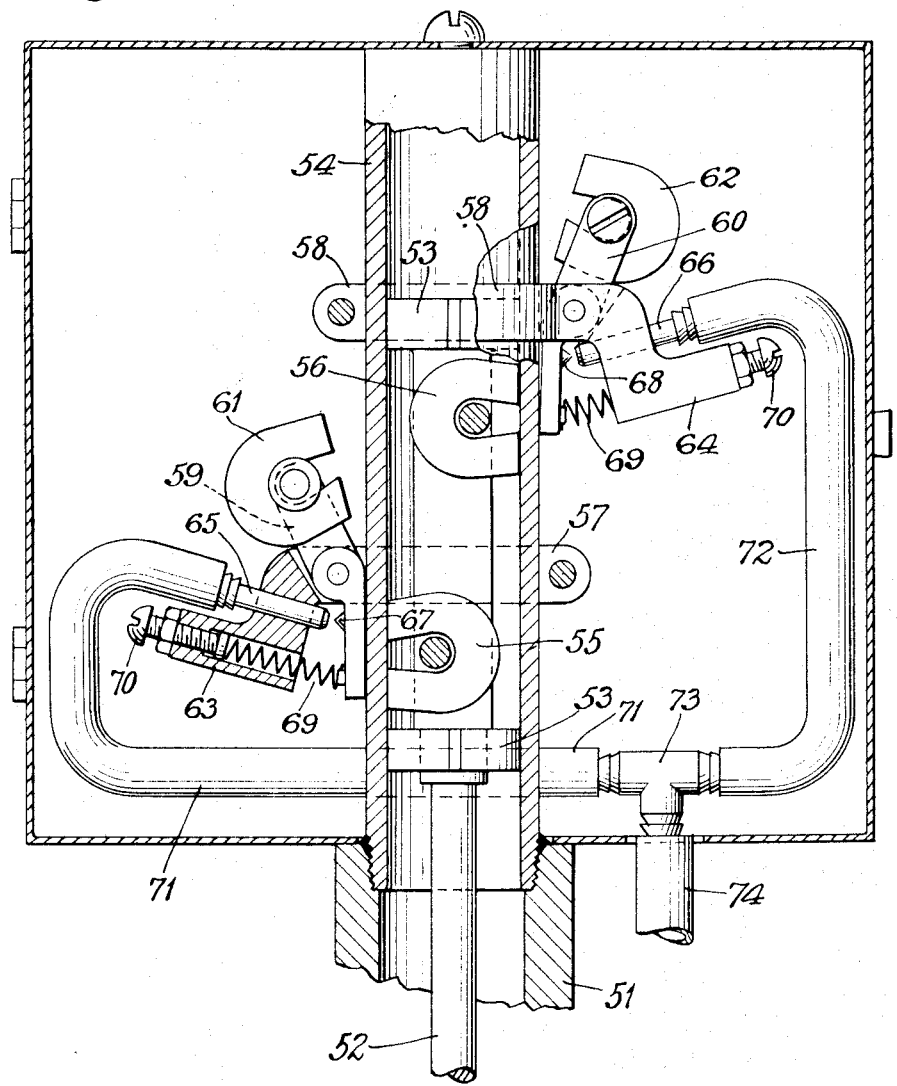

Patented Feb. 11, 1941

2,231,158

UNITED STATES PATENT OFFICE 2,231,158

MAGNETIC CONTROL MECHANISM

George C. Davis, Chicago, Ill., assignor to Davis Regulator Company, Chicago, Ill., a corporation of Illinois Application January 31, 1940, Serial No. 316,693

4 Claims. (Cl. 137—139)

My invention relates to improvements in magnetic control mechanisms, and has for one object to provide means responsive to variations in liquid level or pressure for controlling a valve or other device, wherein the tank or receptacle may be completely closed so far as the control mechanism is concerned and within which no stuffing boxes or the like will be used. Another object is to provide a control wherein no mechanism exists between the pressure or the liquid-level actuating member and the control mechanism.

My invention is illustrated more or less diagrammatically in the accompanying drawings, wherein:

Figure 1 is a section through a form of my device.

Figure 2 is a section through a modified form.

Figure 3 is a section through a further modified form.

Figure 4 is a section through a further modified form.

Like parts are indicated by like characters in the various figures.

1 is a tank. 2 is a float chamber connected thereto by passage 3 below the minimum liquid level and the passage 4 above the maximum liquid level. The liquid level is shown at 5. 6 is a float level in the float chamber. Extending upwardly from the float chamber in liquid-tight connection therewith is a sleeve 7 which may be opened or closed at its upper end. 8 is a float stem, extending upwardly from the float 6 within the sleeve 7. A permanent magnet 9 is mounted rigidly on the stem 8, the stem is preferably polygonal in cross section, and is guided in the sleeve by guides 10 so positioned that they will not interfere with the vertical movement of the stem, but adapted to hold the stem 8 and the magnet 9 against rotation out of alignment. 11 is a fluid supply pipe controlled by valve 12. 13 is a pipe leading from the valve 12 to the tank 1. 14 is a valve stem attached at one end to the valve, and at the other end to a diaphragm 15. 16 is a spring tending normally to hold the valve 14 in closed position so that as fluid under pressure enters through the pipe 11 it is prevented from reaching the tank. The diaphragm 15 is mounted in a housing 25 which is subjected to negative pressure by means of a pipe 17 from any suitable vacuum pump not here shown. 18 is a bleeder pipe associated with the housing 25, terminating in a metering aperture 19 which may be closed by the metering needle valve 20. The needle valve 20 is mounted on a pivoted lever 21. The spring 22, associated with an adjustable screw 23, tends to hold the valve 20 in such position as to close the aperture 19, to prevent the entrance of air which might break the vacuum on the upper side of the diaphragm 15. Any suitable means such as a weighted lever or a piston would accomplish the same effect as the spring 22. 24 is a fixed magnet associated with the lever 21. In the position shown for instance in Figure 1, the fixed magnet 24 and the fixed magnet 9 are in alignment and attract one another to overcome the spring 22, and hold the valve 20 open. This permits air under atmospheric pressure to enter the housing 25 and break the vacuum on the upper side of the diaphragm 15 so that the valve 12 is held closed by the spring 16.

Under the circumstances, with the parts in the position shown in Figure 1, no liquid or fluid under pressure is admitted to the tank 1. If, however, the liquid level falls, the float 6 will descend carrying with it the magnet 9. After a predetermined travel of the magnet 9, the magnetic field, including magnets 9 and 24, will become so attenuated that the attraction between the magnets 9 and 24 will no longer overcome the tension of the spring 22, the spring will then close the valve 20 causing negative pressure to be built up on the diaphragm 15, overcoming the spring 16, and opening the valve 12 to permit the supply of additional liquid to the tank. This will raise the liquid level until magnet 9 has been again brought into such alignment with magnet 24 that the magnetic field again exerts a sufficient force to move the magnet 24 to the right, overcoming spring 22, opening the valve 20, and breaking the pressure on the diaphragm 15 to permit the spring 16 to again close the valve 14.

In the modified form of the device shown in Figure 2, there is substituted for the float and float chamber, a pressure chamber 30, wherein spring diaphragm 31 supports the end of the stem 8. As long as the pressure is sufficient to maintain the diaphragm 31 in the raised position, the magnets 9 and 24 cooperate to keep the valve 20 open. When the pressure falls, the magnet 9 is drawn down by the diaphragm 31 to attenuate the magnetic field and permit the valve 20 to close.

In the modified form shown in Figure 3, there is substituted for the vertical tube 7 a horizontal tube 40 in which is a magnet 41 and a connecting rod 42. This connecting rod is pivoted on a bell crank lever 43, and a link is pivoted to the other end of the bell crank lever and connects with the float 45.

In this device the movement of the float, working through the bell crank lever, instead of moving the magnet 41 vertically across the magnetic field as in Figure 1, moves the magnet 40 toward and from the magnet 24. Separation of the magnets results in sufficiently attenuating the magnetic field so the magnet 24 no longer overcomes the spring 22, and the valve 20 closes. When again the magnet 41 approaches the magnet 24, the magnetic field builds up until it is strong enough to overcome the spring 22.

The action is ordinarily not variable or progressive. Either the effect of the magnetic field is sufficient to open the valve, or it is not, but the response to the magnets may be varied by changing the tension in the spring, or if a lever and counterweight were to be used by changing the size or the position of the weight or both. The movement of one of the moving magnets, or magnetic elements, is such that after a predetermined movement the field becomes attenuated and the magnetic reaction is no longer effective to open the valve or throw the switch, or whatever mechanism is involved. Return of the movable magnetic element finally builds up the field and operation in the opposite direction therefrom.

In the form shown in Figure 4, the housing 51 may contain a float, a lever, or other suitable means for actuating the rod 52 which is guided by collars 53 in the tube 54. Adjustably mounted on the rod 52 are two spaced permanent magnets 55, 56. The tube 54 is preferably of non-magnetic material and has encircling it in adjustable tight frictional engagement therewith collars 57, 58. On each of these collars is pivotally mounted a lever 59, 60. Each lever carries a permanent magnet 61, 62 in opposition respectively to the magnets 55, 56. Lugs 63, 64 project respectively from collars 57, 58 to support the pivots on which the levers 59, 60 are mounted, and each lug carries a needle valve nozzle 65, 66, each nozzle having an orifice adapted to be penetrated by needle valves 67, 68 on levers 59, 60. Springs 69 are socketed in the lugs 63, 64 and are provided with tension adjusting screws 70. Pipes 71, 72, which may be more or less flexible, connect the nozzles 65, 66 with a T 73 on the end of the pipe 74, whose function is the same as the pipe 18.

By the arrangement shown in Figure 4, a much wider range of adjustment is made possible. The relative positions of magnets 55 and 56 and collars 57 and 58 and the parts carried by them may be adjusted, the tension on each of the springs 69 may be adjusted and different nozzles and needle valves may be used so that responses different in time and in amount may be had to movement of the rod 52. For instance, nozzle or orifice 65 may open first. Then as the rod 52 goes farther up, the next orifice may open. Other obvious combinations and adjustments may be used.

Owing to the relatively narrow range of effectiveness of a magnetic field and the relatively small range of movement necessary to render the field operative or inoperative as the case may be, a very positive action results from a slight movement of the moving parts and a very sensitive reaction is thus obtained.

While I have shown two permanent magnets in opposition to one another, a single magnet and an armature might be used, or one or more electromagnets might be, under some circumstances, substituted for the permanent magnets.

While in the preferred form, the magnetic connection between the shaft and the valve control lever takes the form of an opposed pair of magnets, one on the lever and the other on the shaft, the magnetic connection does not necessarily require two opposed magnets. An armature could be substituted for the other magnet of the pair, and, as a matter of fact, each magnet serves as an armature for the magnet opposed to it.

It will be understood, of course, that I have illustrated my device as applied to a bleeder pipe and bleeder valve to control a pressure attenuating valve, but other mechanisms could be used. I wish, therefore, that my drawings and specification be regarded as in a sense diagrammatical.

I claim:

1. In a control mechanism, a supporting rod, means for guiding and means for reciprocating it longitudinally, a plurality of magnets adjustably spaced along the rod, a plurality of supporting members normally fixed in position adjacent to, but out of contact with, the rod and the magnets, each one being separately adjustable longitudinally with respect to the rod, a lever on each supporting member, a magnet on each lever, movable toward and from a magnet on the rod, adjustable, yielding means resisting the angular movement of each lever, and a needle valve adapted to be moved responsive to each lever to control an orifice.

2. In combination, two control members, a lever adapted to actuate each of them, a magnet carried by each lever, adjustable yielding means tending to permit rotation of each lever, a longitudinally movable member, two magnets carried thereby, one in opposition to each of the lever-mounted magnets, each and every one of the magnets being separately longitudinally adjustable along the line of movement of the movable member.

3. A control mechanism including a non-magnetic guide tube, a shaft guided for reciprocation therein, a plurality of magnets carried by the shaft, adjustable in position therealong and enclosed within the tube, a plurality of collars frictionally engaging the tube and adjustable therealong, a lever pivoted on each collar, a magnet on each lever in opposition to one of the magnets on the shaft, adjustable yielding means adapted to resist the angular movement of each lever in response to the cooperation of the lever-supported magnet and its opposed shaft-supported magnet.

4. In combination, a non-magnetic tube, a sleeve encircling the tube, means for locking it adjustably in position therealong, a lever pivoted on the sleeve, a magnetic member on the lever, yielding means tending to rotate the lever to displace the magnetic member away from the outer periphery of the tube, a magnetic member enclosed within the tube, means for displacing it longitudinally therealong to bring the two magnetic members into cooperation and cause the magnetic field between them to overcome the yielding means and draw the two magnetic members together, a control element actuated in response to the rotation of the lever.

GEORGE C. DAVIS.